(12) United States Patent
Davis et al.

(10) Patent No.: US 6,356,674 B1
(45) Date of Patent: Mar. 12, 2002

(54) ELECTRICALLY CONTROLLABLE GRATING, AND OPTICAL ELEMENTS HAVING AN ELECTRICALLY CONTROLLABLE GRATING

(75) Inventors: Gillian Margaret Davis; Robert George Watling Brown, both of Oxfordshire; Paul May, Cambridge, all of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/375,596

(22) Filed: Jan. 20, 1995

(30) Foreign Application Priority Data

Jan. 21, 1994 (GB) ............................................. 9401193

(51) Int. Cl.[7] ............................. G02B 5/18; G02B 6/34; G02F 1/377
(52) U.S. Cl. ........................ 385/10; 359/328; 359/332; 359/569; 372/22; 385/37
(58) Field of Search ................................ 359/326–332, 359/566, 569, 573; 385/3, 10, 37, 122; 372/21, 22

(56) References Cited

U.S. PATENT DOCUMENTS

| | | | |
|---|---|---|---|
| 3,813,142 A | * 5/1974 | Buhrer | 385/10 |
| 3,995,937 A | 12/1976 | Baues et al. | 350/96 WG |
| 4,006,963 A | * 2/1977 | Baues et al. | 385/37 |
| 4,039,249 A | * 8/1977 | Kaminow et al. | 385/10 X |
| 4,115,747 A | * 9/1978 | Sato et al. | 359/573 X |
| 5,093,874 A | 3/1992 | Hawkins et al. | 385/8 |
| 5,222,071 A | * 6/1993 | Pezeshki et al. | 372/22 X |
| 5,349,466 A | 9/1994 | Delacourt et al. | 359/326 |
| 5,412,743 A | * 5/1995 | Brazas, Jr. | 385/10 X |
| 5,416,866 A | * 5/1995 | Sahlén | 385/37 |
| 5,438,637 A | * 8/1995 | Nilsson et al. | 385/10 |
| 5,504,772 A | * 4/1996 | Deacon et al. | 372/102 |

FOREIGN PATENT DOCUMENTS

| | | |
|---|---|---|
| FR | 2684772 | 6/1993 |
| GB | 1516427 | 7/1978 |
| GB | 1557484 | 12/1979 |
| JP | 6067234 | 3/1994 |
| JP | 6110024 | 4/1994 |

OTHER PUBLICATIONS

Search Report for U.K. Appl. GB 9401193.9 dated Apr. 20, 1994.

Risk et al. Optics Letters, vol. 18, No. 4, Feb. 15, 1993, "Distributed–Bragg–Reflection Properties of Segmented KTP Waveguides", pp. 272–4.

Shinozaki et al, Appl. Phys. Lett. 59(5), Jul. 29, 1991, "Self–Quas–Phase–Matched Second–Harmonic Generation in the Proton–Exchanged $LiNbO_3$ Optical Waveguide With Periodically Domain–Inverted Regions," pp. 510–2.

Yamada et al, Appl. Phys. Lett. 62 (5), Feb. 1, 1993, "First–Order Quasi–Phase Matched $LiNbO_3$ Waveguide Periodically Poled by Applying an External Field for Efficient Blue Second–Harmonic Generation," pp. 435–6.

Search Report for European Appl. 95300360.5, Mailed May 4, 1995.

Blistanov et al, "Modulation & Conversion of Light in Lithium Niovate Crystals with a Regular Domain Structure," (1986), Soc. J. Quantum Electron 16 (12), pp. 1678–1679.

* cited by examiner

Primary Examiner—John D. Lee
(74) Attorney, Agent, or Firm—Renner, Otto, Boisselle & Sklar

(57) ABSTRACT

An electrically controllable grating is provided by forming regions 4 and 5 of different refractive index within an electro-optic material. Electrodes are provided so that a readily controllable electric field may be applied to the index grating formed by the alternating regions such that the refractive index of the regions may be varied electrically to form a controllable grating. The grating may be used as an electrically controllable distributed Bragg reflector to allow variable wavelength feedback within a laser cavity. The grating may be used to perform wavelength division multiplexing and/or frequency modulation.

20 Claims, 4 Drawing Sheets

ELECTRICALLY CONTROLLABLE GRATING, AND OPTICAL ELEMENTS HAVING AN ELECTRICALLY CONTROLLABLE GRATING

The present invention relates to an electrically controllable grating and to optical elements having such a grating. Such a grating is suitable for controlling the wavelength of laser light.

It is known to use interdigitated electrodes on electro-optic materials, where application of an electric field causes the formation of a modulating grating within the electro-optic material. The grating can be switched on and off, and may be used to provide beam steering.

GB 1557484 discloses an electro-optical modulator having interdigitated electrodes formed on a surface of a LiNbO$_3$. Application of a voltage to the electrode pattern induces a series of refractive index changes in accordance with the pattern of the electrodes. The pattern of refractive index changes acts as a diffraction grating and the intensities of the orders of the diffracted light vary with the voltage applied to the electrodes.

U.S. Pat. No. 1,516,427 also discloses an electro-optic modulator having interdigitated electrodes formed thereon.

U.S. Pat. No. 3,995,937 discloses a switchable refractive index grating. A series of spaced apart electrodes are arranged in a generally arcuate manner such that the longitudinal axis of each of the electrodes extends towards a common point. The electrodes are arranged in two parallel planes. A waveguide formed in an electro-optic material is positioned intermediate the planes of electrodes. The waveguide follows an arc such that the path of the waveguide is substantially perpendicular to the edges of each electrode. Application of a suitable voltage to the electrodes causes a refractive index grating to be induced within the waveguide. The waveguide is movable radially with respect to the electrodes such that the pitch of the grating can be controlled.

In each of the above, the grating pitch is defined by the electrode pattern and the grating is effectively switched off when no voltage is applied to the electrodes.

According to the present invention, there is provided an electrically controllable grating comprising an electro-optic material and means for applying an electric field to the electro-optic material, characterised in that the electro-optic material has a first portion forming a refractive index grating and comprising an alternating pattern of first regions having a first refractive index in the absence of an electric field and second regions having a second refractive index in the absence of an electric field, the second refractive index being different to the first refractive index.

It is thus possible to vary the refractive index of the material of the refractive index grating and thereby to vary the effective pitch of the grating.

Preferably the means for applying an electric field is arranged to apply an electric field having a component transverse to the refractive index grating.

Preferably first and second electrodes are disposed adjacent the first portion for applying an electric field to the first portion. Advantageously the first and second electrodes are arranged to apply a substantially uniform electric field to the grating.

Advantageously the grating may be included within a laser cavity and be arranged to act as a retro-reflecting grating so as to provide a wavelength controllable laser. The grating may be controlled with a direct current (DC) voltage to perform frequency control suitable for use, for example, in a frequency division multiplexed system. Additionally or alternatively, an alternating voltage, superimposed on a DC voltage (including zero volts) may be applied to the grating to perform frequency multiplexing of the laser.

A plurality of gratings may be provided in parallel so as to enable parallel multiplexing of the laser. Parallel gratings may be formed by provision of segmented electrodes such that a spatially varying electric field may be applied to the first portion. A plurality of lasers may be formed as an array to provide a wavelength division multiplexed light source.

Advantageously the or each laser may further comprise a phase modulator.

Advantageously a grating may be formed in series with at least one optical element on a shared substrate.

Advantageously a grating may be formed in series with a second harmonic generator in order to provide a second harmonic generator which may be electrically controlled to be temperature compensated over a predetermined temperature range.

The grating may advantageously be used as a tunable filter for transmitter and/or receiver elements within an optical communications system.

Furthermore, the grating may be arranged as a surface emitting grating in which the angle of emission is electrically controllable.

The present invention will further be described, by way of example, with reference to the accompanying drawings, in which.

The electro-optic effect gives rise to a change in refractive index of a material when an electric field is applied to the material. The size of the change in refractive index may be easily estimated for a given crystal having a given orientation. For z-cut lithium niobate, the largest electro-optic coefficient is $r_{33}$ whose magnitude is 31 pm/V. The magnitude of the change of refractive index $|\Delta n|$ for a field applied along the z direction is:

$$|\Delta n| = n_e^3 \cdot r_{33} \cdot V/2t \qquad (1)$$

Where:

$n_e$ is the refractive index;

t is the thickness of the crystal;

V is applied voltage; and $r_{33}$ is a coefficient.

The above equation estimates the change in refractive index that is experienced by light propagating along the xy plane with a linear polarisation parallel to the z direction. Thus for a field of $2 \times 10^7$ V/m, equivalent to 1000V across a wafer 50 microns thick, (higher fields may lead to depoling) and $n_e = 2.2$, then the change in refractive index is $\Delta n = 0.0033$.

A refractive index grating may be formed by an alternating pattern of regions of a first refractive index having neighbouring regions of a second refractive index. Such a periodic variation in refractive index can be used as a distributed Bragg reflector. The properties of distributed Bragg reflectors have been reported by W. P. Risk and S. D. Lau, "Distributed-Bragg-reflection properties of segmented KTP waveguides", Optics letters, Vol 18, No 4, pages 272–274, February 1993, and by K. Shinozaki, T. Fukunaga, K. Watanabe, and T. Kamijoh, "Self-quasi-phase-matched second-harmonic generation in the proton-exchanged $LiNbO_3$ optical waveguide with periodically domain-inverted regions", APL vol 59, pages 510–512, 1991.

Figure 1:
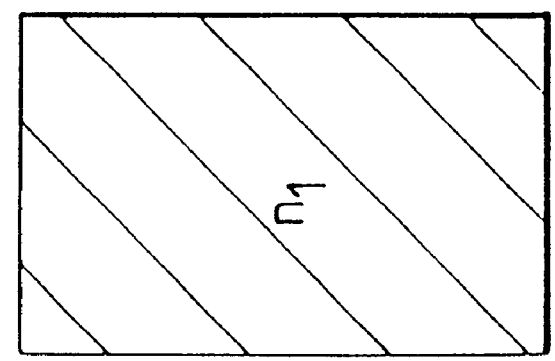
FIG. 1 is a schematic diagram of part of a refractive index grating.

For the structure illustrated in FIG. 1, in which $n_1$ is a region having a first refractive index and $n_2$ is a region having a second refractive index, strong Bragg reflection is obtained when $$(m\lambda_m)/(2n_{\mathit{eff}})=\Lambda \quad (2)$$

where:
  m is an integer greater than zero and represents the order of the reflection;
  $\lambda_m$ is the wavelength of the mth order;
  $n_{\mathit{eff}}$ is the effective refractive index; and
  $\Lambda$ is the spatial period of the reflector (equal to a+b).
To a good approximation, $n_{\mathit{eff}}$ can be found from:

$$n_{\mathit{eff}}=(n_1 a+n_2 b)/(a+b) \quad (3)$$

Thus reflection gratings using Bragg reflection can be designed to be strongly reflecting at a predetermined wavelength.

For a reflection grating having a maximum reflection at approximately 800 nm, the variation of refractive index using the z-cut lithium niobate as described above gives a variation in reflection wavelength over a range of 1.2 nm. Reversal of the polarity of the electric field with respect to the crystal would increase the total tunable range (which may also be known as bandwidth) to 2.4 nm. The same bandwidth is possible at a peak reflectivity of approximately 1500 nm with substantially half the applied voltage.

Figure 2:
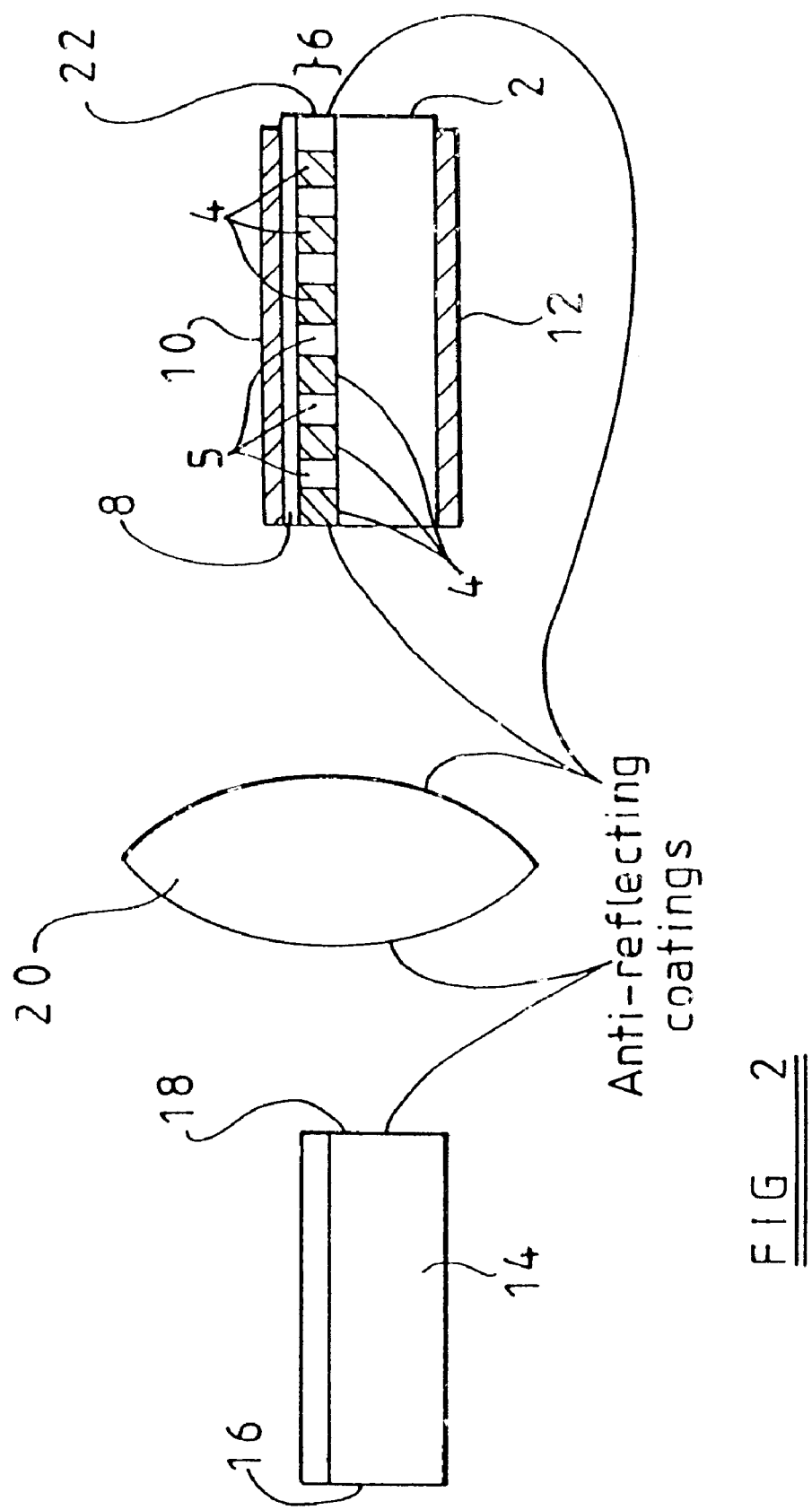
FIG. 2 is a schematic diagram of a laser having an electrically controllable grating constituting an embodiment of the present invention.

The apparatus illustrated in FIG. 2 comprises a wafer 2 of z-cut lithium niobate having a plurality of proton exchanged regions 4 arranged in a regular array with non-exchanged regions 5. The proton exchanged regions 4 have a higher refractive index which is typically 0.1 larger than the non-exchanged regions, thus forming a refractive index grating 6 and a waveguide. A dielectric layer 8 having a refractive index less than that of lithium niobate is formed above the grating 6 and the waveguide. Electrodes 10 and 12 are formed on opposing faces of the wafer 2 above and below the plane of the grating 6. The electrodes are not patterned and consequently the same electric field is applied to the exchanged regions 4 and the non-exchanged regions 5. The avoidance of interdigitated electrodes gives rise to an advantage that there are no problematic fringing fields formed between the electrodes and, as a consequence, the refractive index grating may be formed with a higher periodicity (i.e. more refractive index changes per unit length) than gratings using interdigitated electrodes.

A Fabry-Perot semiconductor laser diode 14 having a highly reflecting facet 16 and an anti-reflecting facet 18 has its anti-reflecting facet 18 facing towards the refractive index grating 6 and is optically coupled to the grating 6 by a lens 20. The anti-reflecting facet 18, the surfaces of the lens 20 and the surfaces of the refractive index grating are provided with anti-reflecting coatings.

The laser diode 14 forms a gain medium within a laser cavity. The grating 6 acts as a retro-reflecting grating at one end of the laser cavity. The other end of the cavity is defined by the highly reflecting facet 16. The grating 6 may be controlled to select the wavelength that is reflected back into the cavity and which is then subjected to amplification by the laser diode 14. Thus the diode 14, the lens 20 and the grating 6 cooperate to form a wavelength tunable laser.

During manufacture a metal mask having openings therein is formed on the surface of the wafer and the wafer is then immersed in an acid bath so that proton exchange occurs in the unmasked regions of the wafer 2, thereby forming the proton exchanged regions 4. The wafer 2 is then thinned until it is approximately 50 microns thick.

Suitable patterning of the wafer allows simultaneous formation of the grating 6 and a waveguide. Optical or electron beam lithographic techniques may be used to form the mask patterning. Electron beam lithography is more suited to the production of first order gratings where, for a laser operating at a wavelength of 1500 nm, the grating period is less than 400 nm with feature sizes of less than 200 nm.

Application of a time invariant electric field across the grating, due to application of a steady voltage to the electrodes 10 and 12, fixes the output wavelength of light emitted from an output 22 of the apparatus. The line width of the output is typically less than 1 Angstrom for a 1 cm long grating.

In an alternative arrangement, the highly reflecting facet 16 may be arranged to transmit a small proportion of the light impinging thereon, and the transmitted light may be taken as the output of the laser.

The laser diode 14 may be amplitude modulated without chirp, i.e. without frequency shift, and thus the output of the apparatus is suitable for use in coherent communication systems and in wavelength division multiplexing systems using narrow channel spacings. In this latter case, the apparatus may be tuned by application of a suitable DC voltage to the electrodes 10 and 12, such that it can occupy any one of a plurality of channels. This is especially useful in passive optical network systems where the wavelengths of the receivers are fixed and routing is determined by the transmitter wavelength. The electro-optic tunable grating may also be used as an electrically controllable filter for receivers in a system where the transmitter wavelengths are fixed and the receivers are tuned to match the transmitter. The above options may be combined to provide a fully flexible system. A wavelength division multiplexed optical source may be provided by an array of such laser/grating combinations. Each laser may be individually amplitude or frequency modulated.

Integration of a quasi phase matched second harmonic generator with the tunable grating is possible, thereby providing a second harmonic generator with well defined wavelength control which is immune to temperature fluctuations over a predetermined range. The formation of a quasi phase matched second harmonic generator in lithium niobate and a periodic structure acting as a distributed Bragg reflector has been described by K. Shinozaki et al (noted above). However, the conditions for quasi phase matching and distributed Bragg reflection are not automatically satisfied over a range of temperatures. The quasi phase matched second harmonic generator region described by Shinozoki et al is formed by periodic domain inversion produced by Ti-diffusion, the difference in refractive index caused by the Ti-diffusion forming a distributed Bragg reflector.

Figure 3:
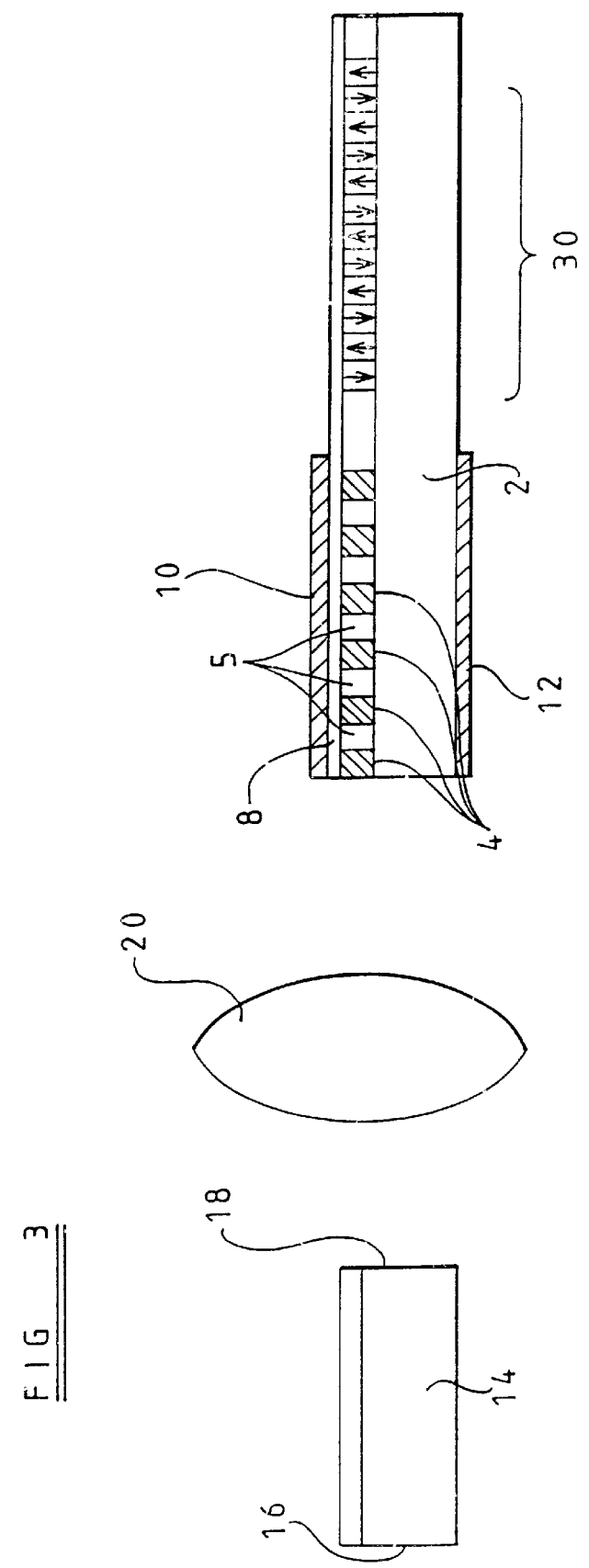
FIG. 3 is a schematic diagram of a laser having a second harmonic generator and an electrically controllable grating constituting an embodiment of the present invention.

FIG. 3 illustrates an apparatus which is similar to that described with reference to FIG. 2. However, a further portion 30 is formed within the wafer 2. The portion 30 comprises a plurality of alternating domains (as indicated by the direction of the arrow within each domain) produced by applying a pulsed electric field such that each domain has the same refractive index as disclosed by M. Yamada, N. Nada, M. Saitoh and K. Watanabe, "First order quasi-phase matched LiNb0$_3$ waveguide periodically poled by applying an external field for efficient blue second-harmonic generation", Applied Physics letters 62, 435 (1993). Thus the portion 30 functions as a quasi phase matched second harmonic generating region but not as a distributed Bragg reflector.

With an electro-optic controlled distributed Bragg reflector and the quasi phase matched second harmonic generating region on the same substrate, the electrically controllable grating can be controlled to compensate for the difference between the change in phase matching wavelength of the quasi phase matched region for a given temperature rise and the change in reflection wavelength of the grating acting as a distributed Bragg reflector for the same temperature rise. For operation with a laser at 1500 nm, this gives rise to a requirement to provide electro-optic control of approximately 0.04 nm/K or ±1.2 nm for operation at 300 kelvin ±30 kelvin. This can be achieved by control voltages of ±500V across a 50 micron wide wafer.

The refractive index grating may be formed within an optical fibre.

Figure 4:
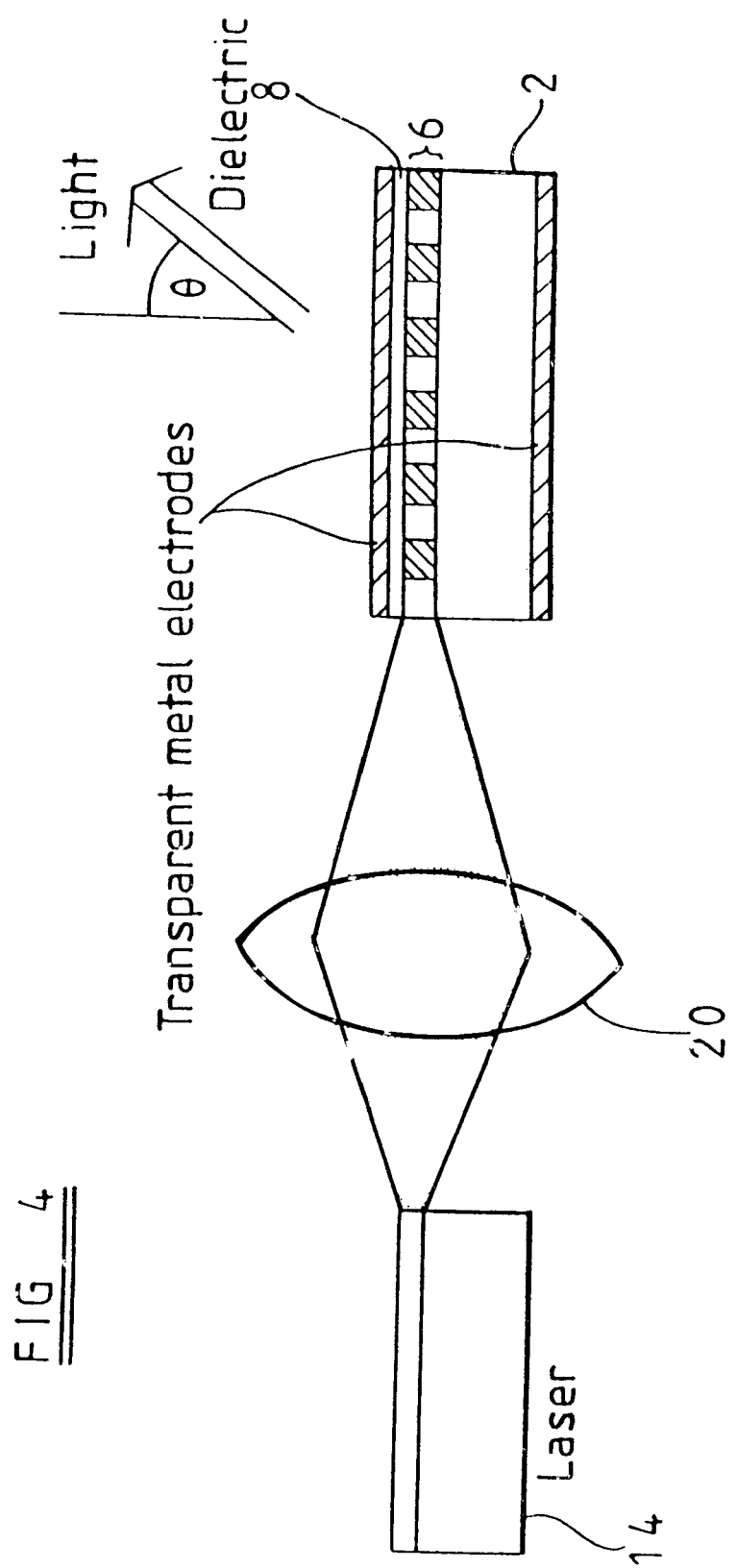
FIG. 4 is a schematic diagram of an electrically controllable surface emitting grating constituting an embodiment of the present invention.

FIG. 4 shows an electronically controllable surface emitting grating. The arrangement is similar to that shown in FIG. 2. However, the lens 20 and the refractive index grating 6 do not form part of the laser cavity of the laser diode 14 as in FIG. 2 but are components which receive the light output of the laser 14. The lens 20 focuses the light from the laser 14 into the refractive index grating 6. Light can be coupled out of the surface of the grating at an angle of θ to the normal.

The angle θ is given by:

$$m\lambda/\Lambda = n_{eff} - \sin\theta \quad (4)$$

where the symbols are as defined hereinbefore.

For θ=45°, $n_{eff} \approx 2.2$, $m=2$, $\lambda=600$ nm, a grating pitch of 800 nm and an electrically controllable variation in refractive index Δn=0.0033, then a variation in θ of 0.3° is obtainable.

It is thus possible to provide an electrically controllable grating. Various electro-optic materials may be used, such as lithium tantalate or potassium titanyl phosphate, but this is not an exhaustive list.

What is claimed is:

1. An electrically controllable grating comprising an electro-optic material and means for applying an electric field to the electro-optic material,
wherein the electro-optic material has a first portion forming a refractive index grating and comprising an alternating pattern of discrete first regions and second regions which are non-overlapping in a direction parallel to the electric field, the first regions having a first refractive index in the absence of an electric field, the second regions having a second refractive index in the absence of an electric field, the second refractive index being different to the first refractive index, and the electric field being uniformly applied to the first and second regions.

2. An electrically controllable grating according to claim 1, wherein the means for applying the electric field is arranged to apply substantially the same electric field to the first and second regions of the refractive index grating.

3. A grating according to claim 1, further comprising first and second electrodes arranged on opposing sides of the refractive index grating for applying the electric field to the refractive index grating.

4. A grating according to claim 1, wherein the grating is contained within an optical waveguide.

5. A grating according to claim 4, wherein the waveguide is cladded by a dielectric layer.

6. An electrically controllable grating according to claim 5, wherein the electro-optic material is lithium niobate, and a refractive index of the dielectric layer is smaller than that of the lithium niobate.

7. A grating according to claim 1, wherein the grating has at least one end surface thereof coated with an anti-reflecting layer.

8. A surface emitting grating comprising a grating as claimed in claim 1.

9. An array of gratings comprising a plurality of gratings as claimed in claim 1.

10. An array according to claim 9, wherein each grating is independently controllable.

11. A tunable optical filter comprising a grating as claimed in claim 1.

12. An electrically controllable grating according to claim 1, wherein the refractive index grating has a maximum reflection at a wavelength of approximately 800 nm, and the grating gives a variation in reflection wavelength over a range of 1.2 nm.

13. An electrically controllable grating according to claim 1, wherein the first regions are proton exchanged regions and the second regions are non-exchanged regions, and the first regions have a higher refractive index which is 0.1 larger than that of the second regions.

14. An electrically controllable grating comprising an electro-optic material and means for applying an electric field to the electro-optic material,
wherein the electro-optic material has a first portion forming a refractive index grating and comprising an alternating pattern of discrete, substantially non-overlapping first regions and second regions, the first regions having a first refractive index in the absence of an electric field, the second regions having a second refractive index in the absence of an electric field, the second refractive index being different to the first refractive index, and the electric field being uniformly applied to the first and second regions, and
wherein the grating is contained within an optical waveguide and the waveguide is an optical fibre.

15. An electrically controllable grating comprising an electro-optic material and means for applying an electric field to the electro-optic material, wherein the electro-optic material has a first portion forming a refractive index grating and comprising an alternating pattern of discrete, substantially non-overlapping first regions and second regions, the first regions having a first refractive index in the absence of an electric field and the second regions having a second refractive index in the absence of an electric field, the second refractive index being different to the first refractive index, and
wherein the electro-optic material has a second portion which is optically in series with the first portion and which comprises a non-linear optical element.

16. A grating according to claim 15, wherein the non-linear optical element is a second harmonic generator.

17. A grating according to claim 16, wherein the second harmonic generator is a quasi-phase matched second harmonic generator.

18. A grating according to claim 15, wherein the second portion is contained within an optical waveguide.

19. A grating according to claim 18, wherein the waveguide is cladded by a dielectric layer.

20. An electrically controllable grating comprising an electro-optic material and means for applying an electric field to the electro-optic material, wherein the electro-optic material has a first portion forming a refractive index grating and comprising an alternating pattern of discrete, substantially non-overlapping first regions and second regions, the first regions having a first refractive index in the absence of an electric field, the second regions having a second refractive index in the absence of an electric field, the second refractive index being different to the first refractive index, and the electric field being uniformly applied to the first and second regions, and wherein the electro-optic material comprises lithium niobate, lithium tantalate or potassium titanyl phosphate.

* * * * *